United States Patent [19]
Ooe

[11] Patent Number: 5,712,975
[45] Date of Patent: Jan. 27, 1998

[54] INPUT/OUTPUT CELL IN PARALLEL COMPUTER AND PARALLEL COMPUTER SYSTEM

[75] Inventor: Kazuichi Ooe, Kawasaki, Japan

[73] Assignee: Fujitsu Limited, Kawasaki, Japan

[21] Appl. No.: 381,396

[22] Filed: Jan. 31, 1995

[30] Foreign Application Priority Data

Feb. 24, 1994 [JP] Japan .................................. 6-026488

[51] Int. Cl.⁶ .................................................. G06F 13/00
[52] U.S. Cl. .......................................... 395/200.2; 395/441
[58] Field of Search ........................ 395/200.2, 200.02, 395/200.06, 200.08, 200.01, 441

[56] References Cited

U.S. PATENT DOCUMENTS

5,191,651  3/1993  Halim et al. ...................... 395/200.2
5,410,650  4/1995  Sasaki et al. ..................... 395/200.2

Primary Examiner—Glenn A. Auve
Attorney, Agent, or Firm—Staas & Halsey

[57] ABSTRACT

An input/output control unit switches modes between a parallel access mode in which a plurality of I/O interfaces, to which a plurality of external storage devices are connected, are collectively controlled as if they were a single interface and an individual access mode in which the plurality of interfaces are individually controlled. Data can be distributed or combined when transmitted between the external storage devices and a network.

12 Claims, 9 Drawing Sheets

(A) DISK DEVICE

A 0 : CELL 0 LOCAL FILE
A 16 : CELL 16 LOCAL FILE
A 32 : CELL 32 LOCAL FILE (B) MEMORY OF INPUT/OUTPUT CELL (C)

FROM/TO CELL 0

FROM/TO CELL 16

FROM/TO CELL 32

INPUT/OUTPUT CELL IN PARALLEL COMPUTER AND PARALLEL COMPUTER SYSTEM

BACKGROUND OF THE INVENTION

1. Field of the Invention

The present invention relates to a cell accessible to external storage devices such as disk devices in a parallel computer, and more specifically to an input/output cell and a parallel computer system using the cell in a parallel computer having the functions of processing redundant arrays of inexpensive disks (RAID) and of automatically distributing and combining data when sending and receiving data over a network.

2. Description of the Related Art

In a massively parallel computer (MPP) system, a number of processing devices (referred to as cells) transmit data over a network and perform respective processes assigned to them.

An access pattern generated in such a massively parallel computer system can be classified into the following two patterns. The first access pattern is used for a small number of large files. The second access pattern is used for a large number of small files.

In the first access pattern, the access performance depends on an input/output (I/O) bandwidth. In a common computer system, the problem with the I/O bandwidth can be solved by redundant arrays of inexpensive disks (a RAID system). The RAID system uses a plurality of disk devices, and the data are distributed when accessed for a writing operation and written in parallel to the plurality of disk devices. System performance can be greatly improved because a plurality of the disk devices are operated in parallel. Additionally, the reliability of data can be maintained because a data correction parity is calculated and is written to the disk device together with the above described data.

A practical example of the RAID system uses 42 disk devices to be operated in parallel when data are accessed, thereby obtaining a transfer rate calculated by (transfer rate of one disk device)×(I/O bandwidth of the number of disk devices).

In the second access pattern, the access performance depends on the hit ratio of the file cache mechanism, a disk seek time, and a disk operation wait time. In this case, the I/O bandwidth is not an important factor. In particular, if cache data are mishit and access concentrates on disk devices in a file cache mechanism, then it is generally regarded as a better time saving method in an entire system to independently access a plurality of disk devices from a plurality of I/O interfaces than to access a plurality of disk devices in parallel from one I/O interface. However, according to the conventional RAID system, the function of combining/distributing data is incorporated in an equipment of a disk controller and a plurality of disk devices appear only a single large disk device from a cell equipment. Thus, there is a problem that the disk devices cannot be accessed separately.

Furthermore, if an application program of single program multiple data (SPMD) is executed in a massively parallel computer and if a large problem is to be solved, then access is attained to a large file. In such a case, the above described RAID system is recommended as an appropriate mechanism of accessing a disk device. However, each cell does not require all data read from the disk device but requires only a part of them. Since all data are transmitted to each cell in conventional technologies, access cannot be attained efficiently.

Generally, it takes a long I/O time in accessing disk devices, magnetic tape devices, etc. and therefore various systems and methods have been developed conventionally so that user tasks overlap I/O processes when they are executed. In particular, an IOP, which is a processor exclusively used for an I/O process is equipped in a mainframe. With a system operated using the IOP, the CPU transfers an I/O instruction after it has issued the I/O instruction to the IOP. Then, the CPU can perform a user task independently from the IOP until the CPU is given by the IOP a notice of an I/O instruction termination interrupt. However, with the conventional parallel computer systems, a complicated interface is anticipated between an IOP adopted in the mainframe and each cell. Therefore, the IOPs are rarely adopted at present.

SUMMARY OF THE INVENTION

The present invention has been developed based on the above described background. It aims to enable a parallel access to a plurality of disk devices and an individual access to be attained selectively. It also aims to distribute the data read from the disk devices, combine the data, and write them to the disk devices. Furthermore, it aims to have a user task overlap an I/O process at each cell when they are executed.

According to the present invention, a plurality of input/output cells capable of executing instructions are connected over a network and operated in a parallel computer systems. The input/output cell comprises a plurality of input/output interface units; a mode switching unit for switching access modes between a parallel access mode in which the plurality of input/output interface units are collectively controlled as if they were a single input/output interface unit and an individual access mode in which a plurality of input/output interface units are individually controlled; and an input/output control unit for controlling access to a plurality of external storage devices connected to the plurality of input/output interface units from the cells which are connected to a network and has no function of directly inputting/outputting data to and from the external storage devices.

The present invention also comprises a file server unit for providing the function of accessing files processed by the external storage devices controlled by the input/output control unit for the cells which are connected to a network and has no function of directly inputting/outputting data to and from the external storage devices.

It further comprises a data distributing unit for sending data to a network after distributing the data based on the number of strides and a stride width specified by a cell which issues an instruction to access the data when the data accessed from the external storage device are sent over the network.

Additionally, it comprises a data combining unit for combining data when they are received over the network and written to the external storage devices.

The above designed input/output cell can be further structured in a parallel computer system such that it is additionally connected as a subcell to a normal cell, or directly connected to a network independently of normal cells.

Thus, the input/output cell enables a plurality of input/output interface units to be collectively operated to access corresponding external storage devices in parallel and to individually access the external storage devices corresponding to the input/output interface units. Therefore, the I/O resources can be efficiently utilized when a small number of large files are accessed and when a large number of small files are accessed.

The present invention also enables the input/output data to be quickly transferred to each cell or written to an external storage device when an SPMD-type application program is executed.

Furthermore, adding a file server to the input/output cell enables a user task process to overlap an input/output process (I/O process) when they are performed, thereby greatly improving the system performance.

BRIEF DESCRIPTION OF THE DRAWINGS

Other objects and features of the present invention can be easily recognized by one of ordinary skill in the art by referring to the attached drawings and the preferred embodiment in this specification.

DESCRIPTION OF THE PREFERRED EMBODIMENTS

Figure 1:
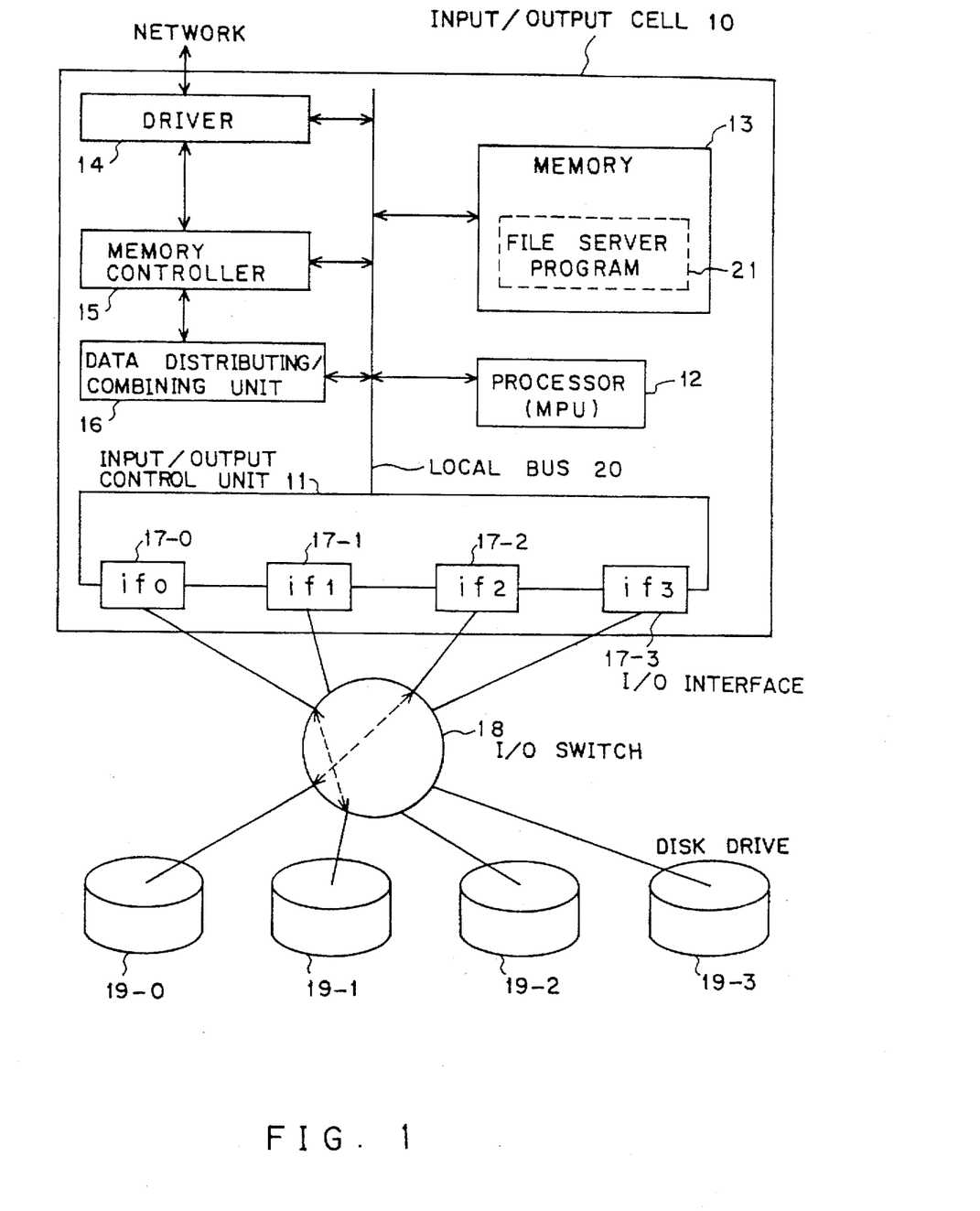
FIG. 1 shows the configuration of the input/output cell according to a preferred embodiment of the present invention.

FIG. 1 shows the configuration of the input/output cell according to the preferred embodiment of the present invention.

An input/output cell 10 provides a function of accessing files for other cells (refer to 91-0~91-n in FIG. 9A and 92-0~92-n in FIG. 9B explained later) in a parallel computer system by having a processor (MPU) 12 execute each instruction in a file server program 21 stored in a memory 13.

The input/output cell 10 comprises an input/output control unit 11 for controlling access external storage devices such as disk devices 19-0~19-3, etc. The input/output control unit 11 comprises a plurality of I/O interfaces 17-0~17-3 and a mechanism for switching modes between a parallel access mode in which the plural interfaces are collectively controlled as if they were a single interface and an individual access mode in which they are individually controlled. The input/output control unit 11 controls access to the disk devices 19-0~19-3 connected to the I/O interfaces 17-0~17-3. An I/O switch 18 switches dynamically switches the connections between the I/O interfaces 17-0~17-3 in the input/output control unit 11 and the disk devices 19-0~19-3.

The processor 12 performs a reading or writing operation in the memory 13.

A memory controller 15 controls access to the memory 13. The memory controller 15 analyzes the contents of the header of a packet input or output over a network (refer to 90 shown in FIG. 9A or 9B described later) and controls the transmission and reception of packets.

A driver 14 sends and receives data (in packets) over a network to which other cells are connected.

When data are read from the disk devices 19-0~19-3 through the input/output control unit 11 and sent to the network, a data distributing/combining unit 16 sends the data through the network after distributing them based on the specified number and width of strides (described later). When the data are received over the network and written to the disk devices 19-0~19-3 through the input/output control unit 11, the data distributing/combining unit 16 also combines the data to write them to the disk devices 19-0~19-3.

A local bus 20 interconnects the input/output control unit 11, the processor 12, the memory 13, the driver 14, the memory controller 15, and the data distributing/combining unit 16.

The input/output cell 10 can be additionally connected as a subcell to a normal cell which is connected to a network and has no function of directly inputting/outputting data to external storage devices (refer to FIG. 9A explained later). In this case, the cell can be commonly connected as a subcell to all cells connected to the network. Otherwise, the cell can be directly connected independently of the normal cells to the network to which the normal cells are connected (refer to FIG. 9B explained later).

With the above described configuration according to the preferred embodiment, the input/output control unit 11 comprises a mechanism for switching access modes between a parallel access mode in which a plurality of I/O interfaces 17-0~17-3 are collectively controlled as if they were a single interface and an individual access mode in which they are individually controlled. Therefore, the input/output control unit 11 optionally switches between the aspect in which the plurality of disk devices 19-0~19-3 are accessed in parallel by a system similar to the above described RAID system and the aspect in which the plurality of disk devices 19-0~19-3 are individually accessed. Thus, the I/O resources can be efficiently utilized when a small number of large files are accessed and when a large number of small files are accessed at random.

The data distributing/combining unit 16 is allowed to send data to another cell after reading data from the disk devices 19-0~19-3, distributing them, and providing them with, for example, packet headers. It is also allowed to combine the data received from a plurality of cells to write them to the disk devices 19-0~19-3. Therefore, when an application of the above described single program multiple data SPMD is performed, the data distributing/combining unit 16 quickly transfers data between each cell and the disk devices 19-0~19-3.

In FIG. 1, a file server function is provided for the input/output cell 10 to exclusively perform an I/O process. With this configuration, a normal cell sends an I/O instruction to the input/output cell 10, and a user task, for example, can be performed until a response is given from the input/output cell 10. Therefore, the user task performed by a normal cell overlaps in time an I/O process performed by the input/output cell 10, thereby practically shortening the waiting time for the I/O process.

Figure 2:
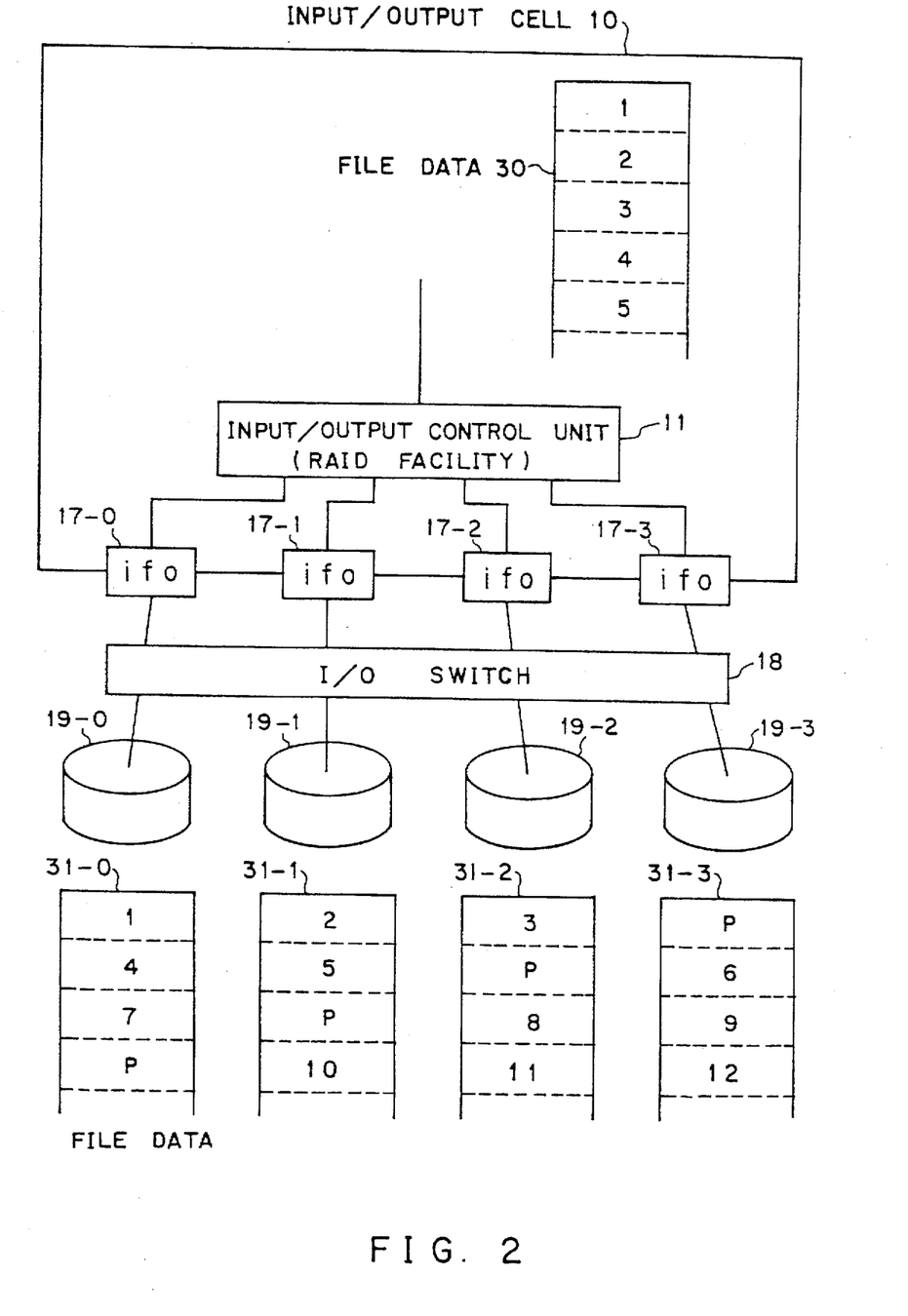
FIG. 2 shows the RAID facility according to a preferred embodiment of the present invention.

FIG. 2 shows the RAID facility according to the preferred embodiment of the present invention.

The input/output control unit 11 is provided with the above described RAID facility which is one of the disk array systems. In the RAID facility, file data 30 sequentially arranged in the order of data 1, 2, 3, ... are written as being distributed as file data 31-0~31-3 in the disk devices 19-0~19-3. Writing and reading operations performed on the plurality of disk devices 19-0~19-3 are carried out in parallel. Data P in the file data 31-0~31-3 are parity data for error correction.

The input/output control unit 11 has the function of individually controlling each of the I/O interfaces 17-0~17-3 so that each of the disk devices 19-0~19-3 can be individually accessed in case a number of small files are to be accessed at random. Hereinafter, the mode in which the disk devices 19-0~19-3 are accessed in parallel using the RAID facility is referred to as a parallel access mode, while the mode in which the disk devices 19-0~19-3 are individually accessed is referred to as an individual access mode. These modes can be switched to each other by changing the settings of the control register in the input/output control unit 11.

According to the preferred embodiment shown in FIGS. 1 and 2, 4 disk devices 19-0~19-3 are connected to a single input/output cell 10. It is obvious that the optional number of the disk devices 19-0~19-3 can be mounted as long as more than one device is mounted.

Figure 3:
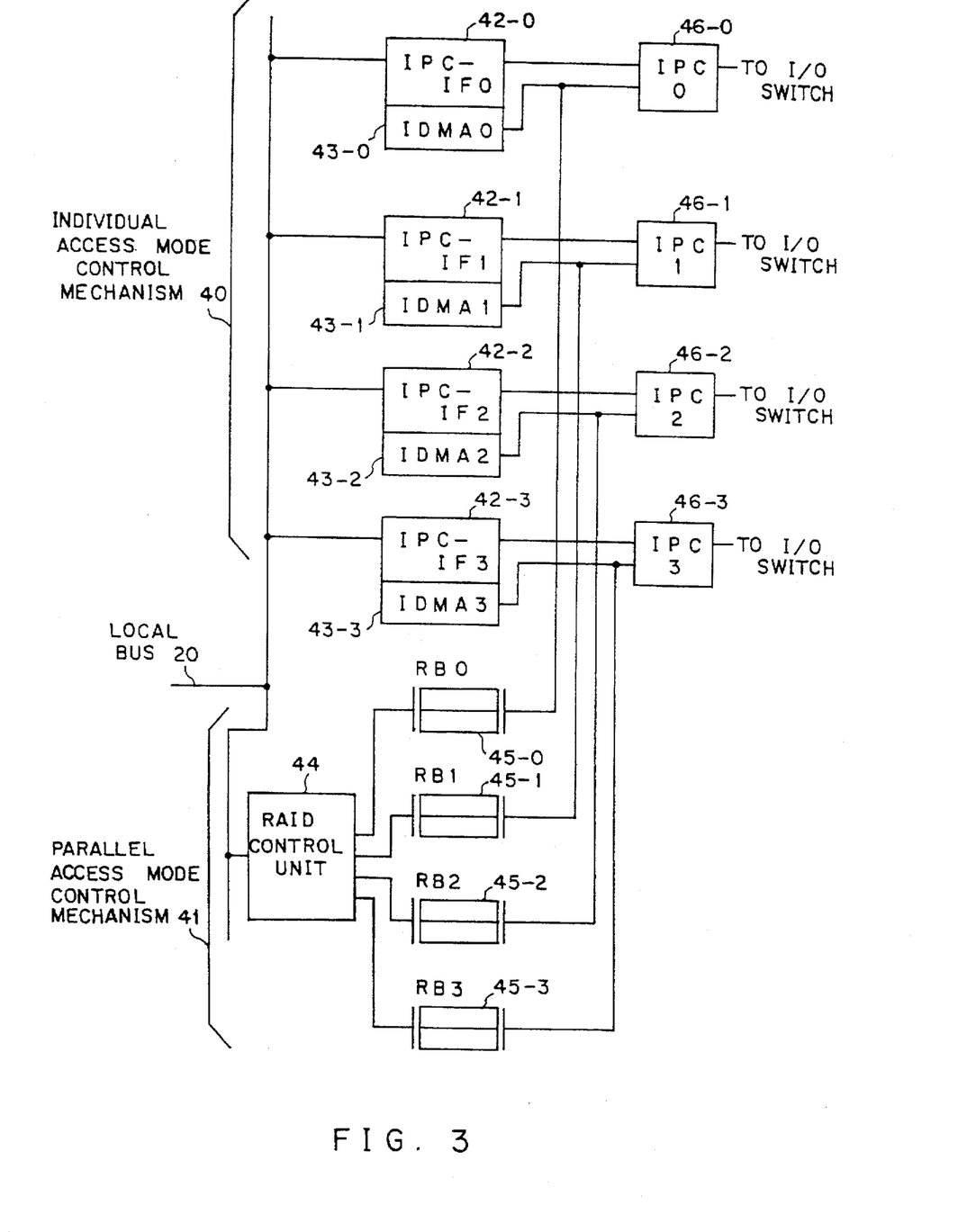
FIG. 3 shows the configuration of the input/output control unit according to a preferred embodiment of the present invention.

FIG. 3 shows the configuration of the input/output control unit 11 shown in FIG. 1. The input/output control unit 11 comprises an individual access mode control mechanism 40 and a parallel access mode control mechanism 41.

I/O protocol controller 46-0~46-3 (IPC 0~IPC 3) are commonly used by both mechanisms, control the interface between the input/output control unit 11 and the disk devices 19-0~19-3, and corresponds to the I/O interfaces 17-0~17-3.

Control registers 42-0~42-3 (IPC-IF 0~IPC-IF 3) are contained in the individual access mode control mechanism 40 and control the interface between the local bus 20 (refer to FIG. 1) and the I/O protocol controller 46-0~46-3. The processor 12 shown in FIG. 1 individually controls the interface for the disk devices 19-0~19-3 by writing control information to the control registers 42-0~42-3. Control registers 43-0~43-3 (IDMA 0~IDMA 3) are contained in the individual access mode control mechanism 40 and controls the interface between the local bus 20 and the I/O protocol controller 46-0~46-3 during the data transmission by the direct memory access (DMA) system. The processor 12 controls the DMA transmission to the disk devices 19-0~19-3 by writing the control information in the control registers 43-0~43-3.

A RAID control circuit 44 is contained in the parallel access mode control mechanism 41 and controls the RAID facility. Ring buffers 45-0~45-3 (RB 0~RB 3) are contained in the parallel access mode control mechanism 41 and temporarily stores transmission data when the disk devices 19-0~19-3 are accessed in parallel. When a reading operation is performed in the disk devices 19-0~19-3 in the parallel mode, the RAID control circuit 44 combines the data read in parallel from the disk devices 19-0~19-3 and temporarily stored in the ring buffers 45-0~45-3, and then sends them to the local bus 20. When a writing operation is performed in the disk devices 19-0~19-3 in the parallel access mode, the RAID control circuit 44 distributes the data transferred through the local bus 20 to the ring buffers 45-0~45-3, and then writes them in parallel to the disk devices 19-0~19-3. If an error correcting function is added to access data, the RAID control circuit 44 is provided with a decoder/encoder of error check codes (ECCs).

When an individual access mode is entered, the interface for each of the disk devices 19-0~19-3 is controlled using the control registers 42-0~42-3 and the control registers 43-0~43-3. If a parallel access mode is entered, parallel access is attained to the disk devices 19-0~19-3 using the RAID control circuit 44.

Figure 4:
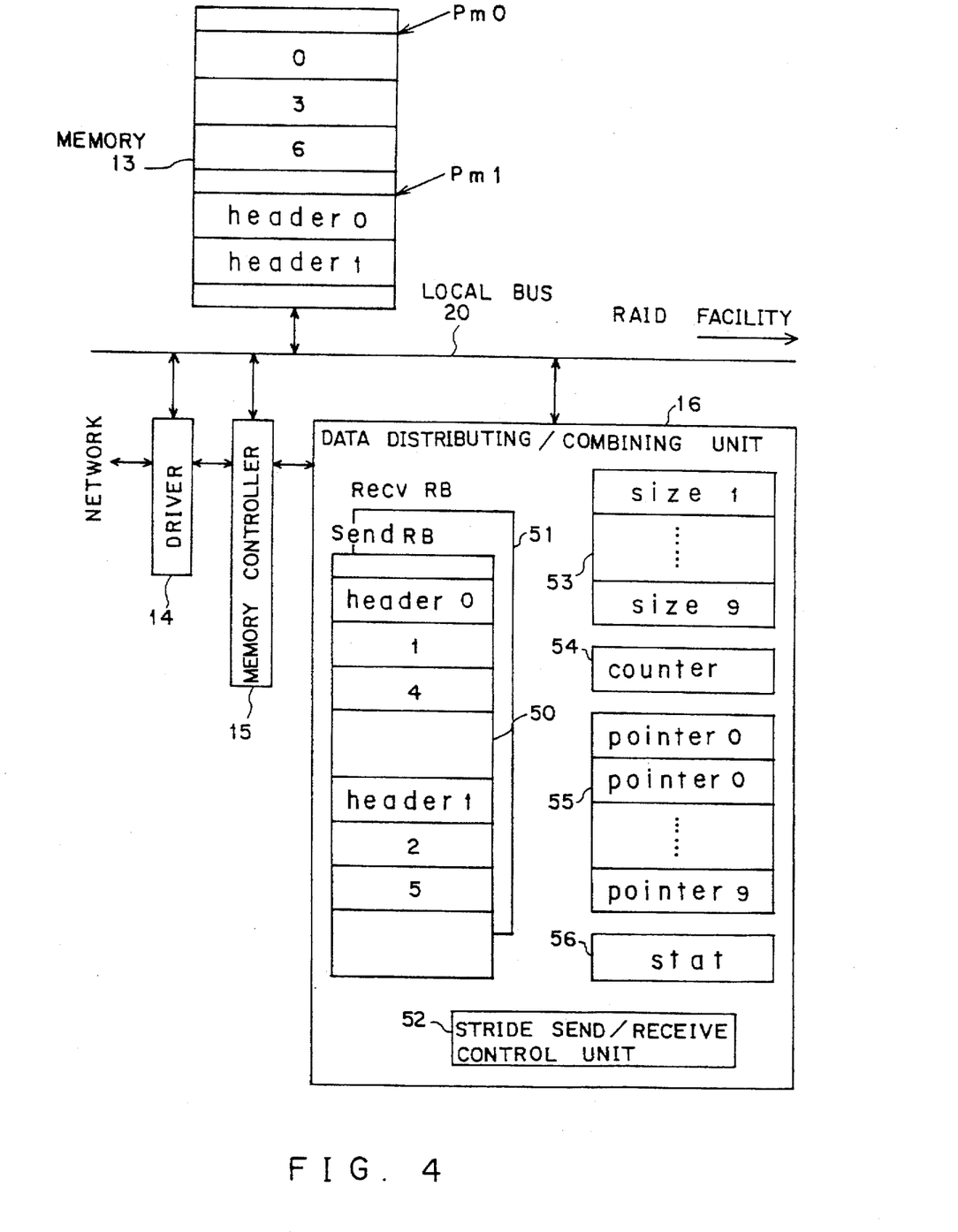
FIG. 4 shows the configuration of the data distributing/combining unit according to a preferred embodiment of the present invention.

FIG. 4 shows the configuration of the data distributing/combining unit 16 shown in FIG. 1.

The data distributing/combining unit 16 comprises a sending ring buffer 50, a receiving ring buffer 51, a stride send/receive control unit 52, and interface registers 53, 54, 55, and 56. The stride send/receive control unit 52 contains a DMA mechanism and performs the following operations.

If the data are read from the disk devices 19-0~19-3 through the input/output control unit 11 and transferred to the memory 13 shown in FIG. 1 or through a network not shown in FIG. 1 (to each cell), then the stride send/receive control unit 52 transfers the data read from the disk devices 19-0~19-3 to the memory 13 or the sending ring buffer 50 according to preliminarily stored information. In particular, when the data are transferred to the sending ring buffer 50, the stride send/receive control unit 52 first transfers to the sending ring buffer 50 the packet header (header 0) stored at or after address Pm 1 in the memory 13 preliminarily specified as shown in FIG. 4, and then transfers the data read from the disk devices 19-0~19-3 to the sending ring buffer 50. In FIG. 4, the numbers in the data preceded by headers 0 and 1 in the sending ring buffer 50 correspond to the numbers in the file data 31-0~31-3 shown in FIG. 2. Then, the stride send/receive control unit 52 activates the memory controller 15 shown in FIG. 1 if the data have been transferred completely or to some extent from the disk devices 19-0~19-3 to the sending ring buffer 50, and has the controller send the data in the sending ring buffer 50 through the driver 14. The description "the data have been transferred to some extent" indicates that enough data have been transferred before the memory controller 15 has completely transferred all data stored in the sending ring buffer 50 by the completion of the data transfer from the disk devices 19-0~19-3. The sending ring buffer 50 is provided to absorb the difference between the data read rate from the disk devices 19-0~19-3 and the data transfer rate over the network.

When the data in the memory 13 or the data transferred from the network to the receiving ring buffer 51 are written to the disk devices 19-0~19-3, the stride send/receive control unit 52 activates individual access mode control mechanism 40 or the parallel access mode control mechanism 41 in the input/output control unit 11 as shown in FIG. 3 according to the preliminarily given information after all specified packets have been received by the memory 13 or the receiving ring buffer 51 over the network. If the activation has been completed, the stride send/receive control unit 52 transfers the data written in the memory 13 or the receiving ring buffer 51 to the disk devices 19-0~19-3 using the DMA facility. The memory controller 15 determines whether the packets received through the driver over the network are to be written to the memory 13 or the receiving ring buffer 51 by decoding the contents of the header of the packet.

To support the capabilities of the stride send/receive control unit 52, the processor 12 sets various control information in the interface registers 53, 54, 55, and 56 in the data distributing/combining unit 16.

The register 55 is a pointer register and stores pointers to positions where data are stored or to packet headers.

The register 56 sets the following states.

1. Number of strides.
2. Information as to whether data are written to the memory 13 or transmitted to a network at each stride.
3. Information as to whether the stride is associated with the disk devices 19-0~19-3 or the memory 13.

If a stride to the disk devices 19-0~19-3 is specified in the register 56, pointer 0 in the register 55 refers to a pointer to the memory 13 or the network, and pointers 1~9 in the register 55 indicate disk blocks. If a stride to the memory 13 or to the network is specified in the state setting register 56, then pointer 0 in the register 55 indicates a disk block and pointers 1~9 in the register 55 indicate pointers to the memory 13.

Figure 5:
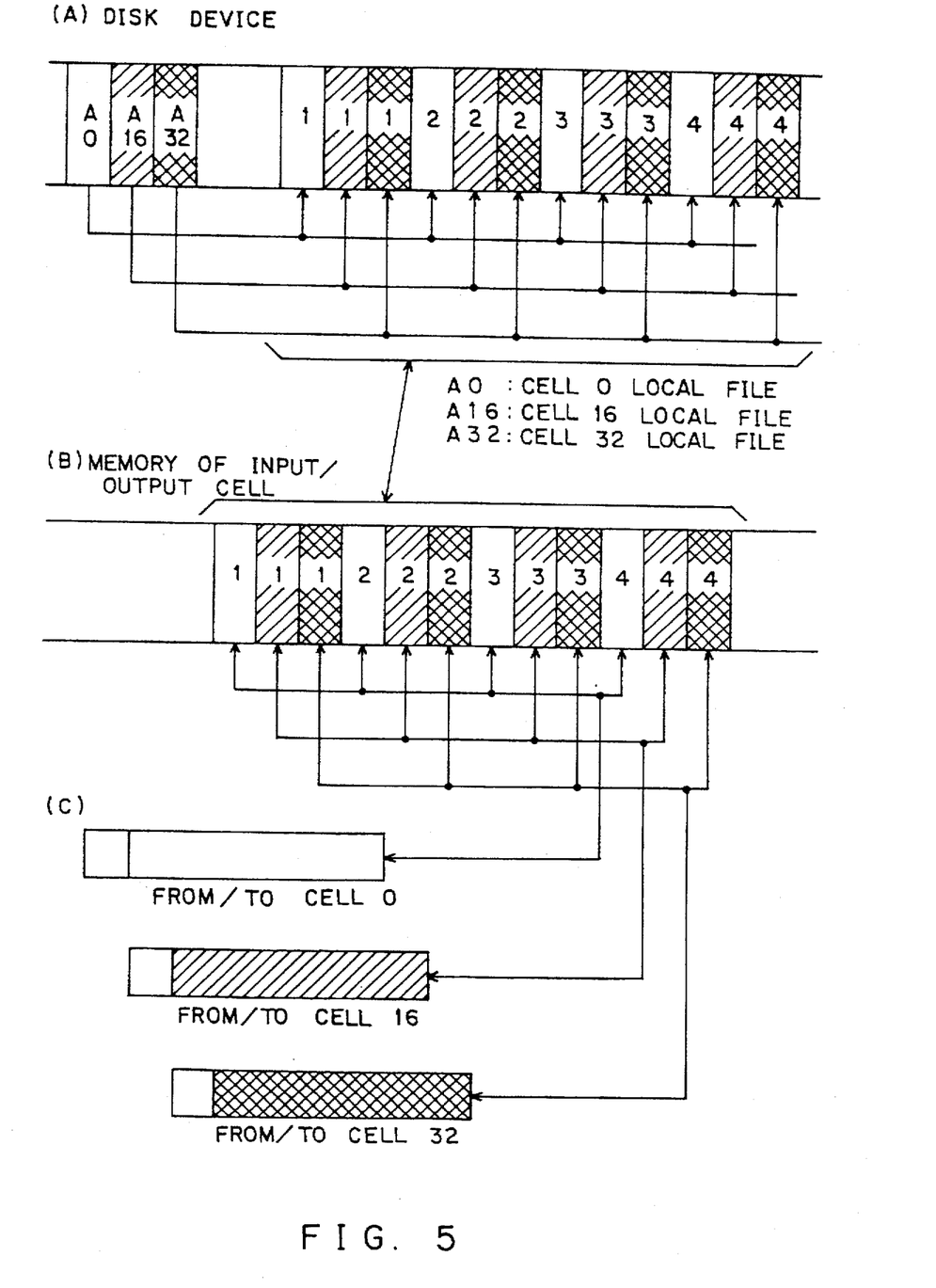
FIGS. 5A, 5B and 5C show examples of a combining operation of the data distributing/combining unit according to a preferred embodiment of the present invention.

FIG. 5 shows an example of data distributing and combining operations performed by the data distributing/combining unit 16. In this example, the local files assigned to three cells 0, 16, and 32 are processed by the input/output cell 10. The data are arranged by one or more disk devices as shown in part (A) of FIG. 5. In part (A) of FIG. 5, A0 is managed as a local file assigned to cell 0; A16 is managed as a local file assigned to cell 16; and A32 is managed as a local file assigned to cell 32. The same pattern of the portions numbered 1, 2, 3, and 4 refers to the same local file. The numbers indicate the sequence of the data.

Upon receipt of a data write request from cell 0, 16, or 32, the file server program 21 (refer to FIG. 1) executed by the input/output cell 10 has the data distributing/combining unit 16 combine the data sent from the cells as shown in part (C) of FIG. 5 in the memory 13 in the input/output cell 10 (refer to FIG. 1) as shown in part (B) of FIG. 5 or in the receiving ring buffer 51 (refer to FIG. 4). Then, it stores the combined data in the disk device as if they were a single file as shown in part (A) of FIG. 5.

When the file server program 21 receives a data read request from cell 0, 16, or 32, it has the data distributing/combining unit 16 distribute corresponding to each cell as shown in part (C) of FIG. 5 the data read by the memory 13 in the input/output cell 10 as shown in part (B) in FIG. 5 or by the receiving ring buffer 51. Then, it sends the distributed data to the corresponding cells over the network through the memory controller 15 and the driver 14 (refer to FIG. 1).

Figure 6:
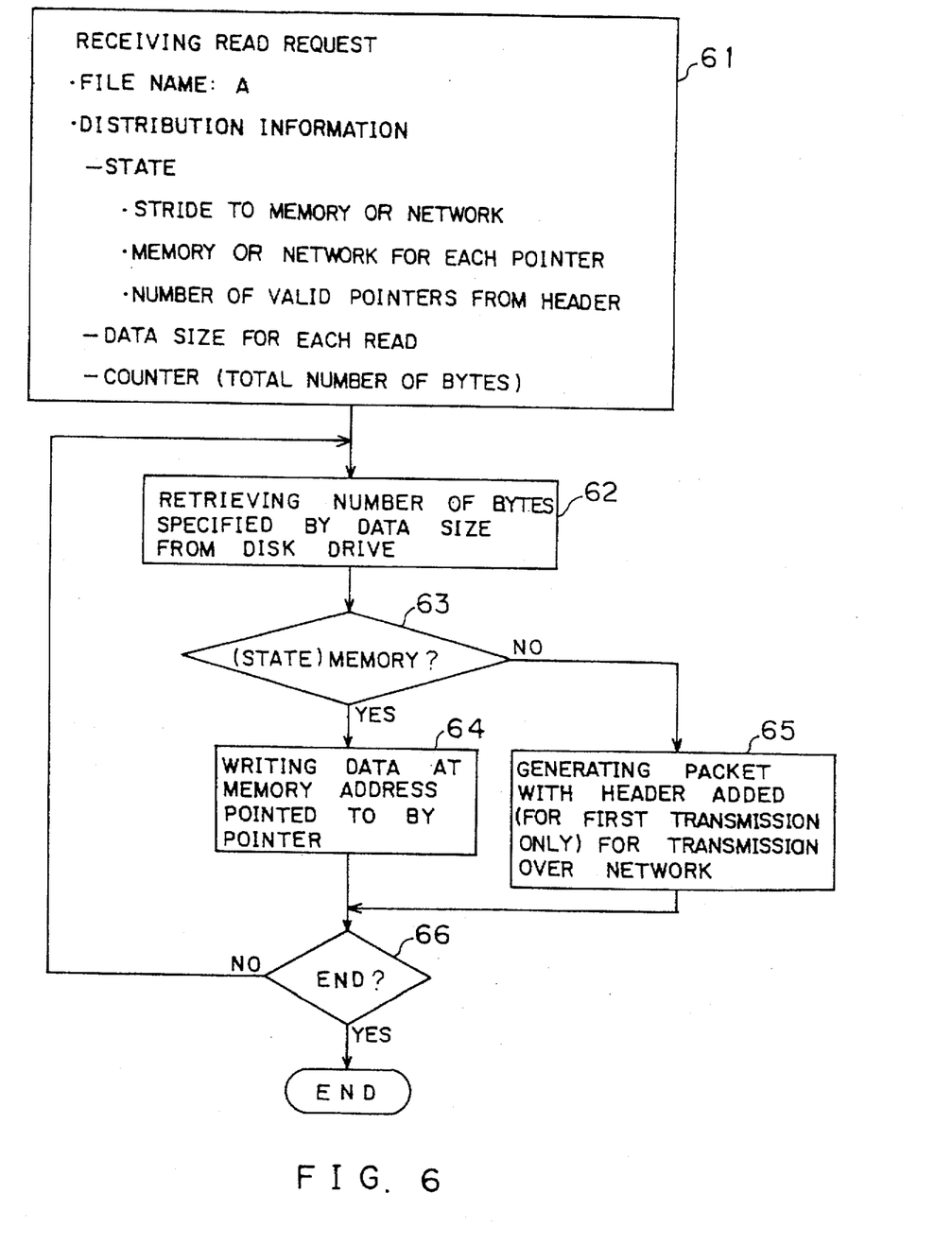
FIG. 6 shows an example (1) of a file server process according to the preferred embodiment of the present invention.
Figure 7:
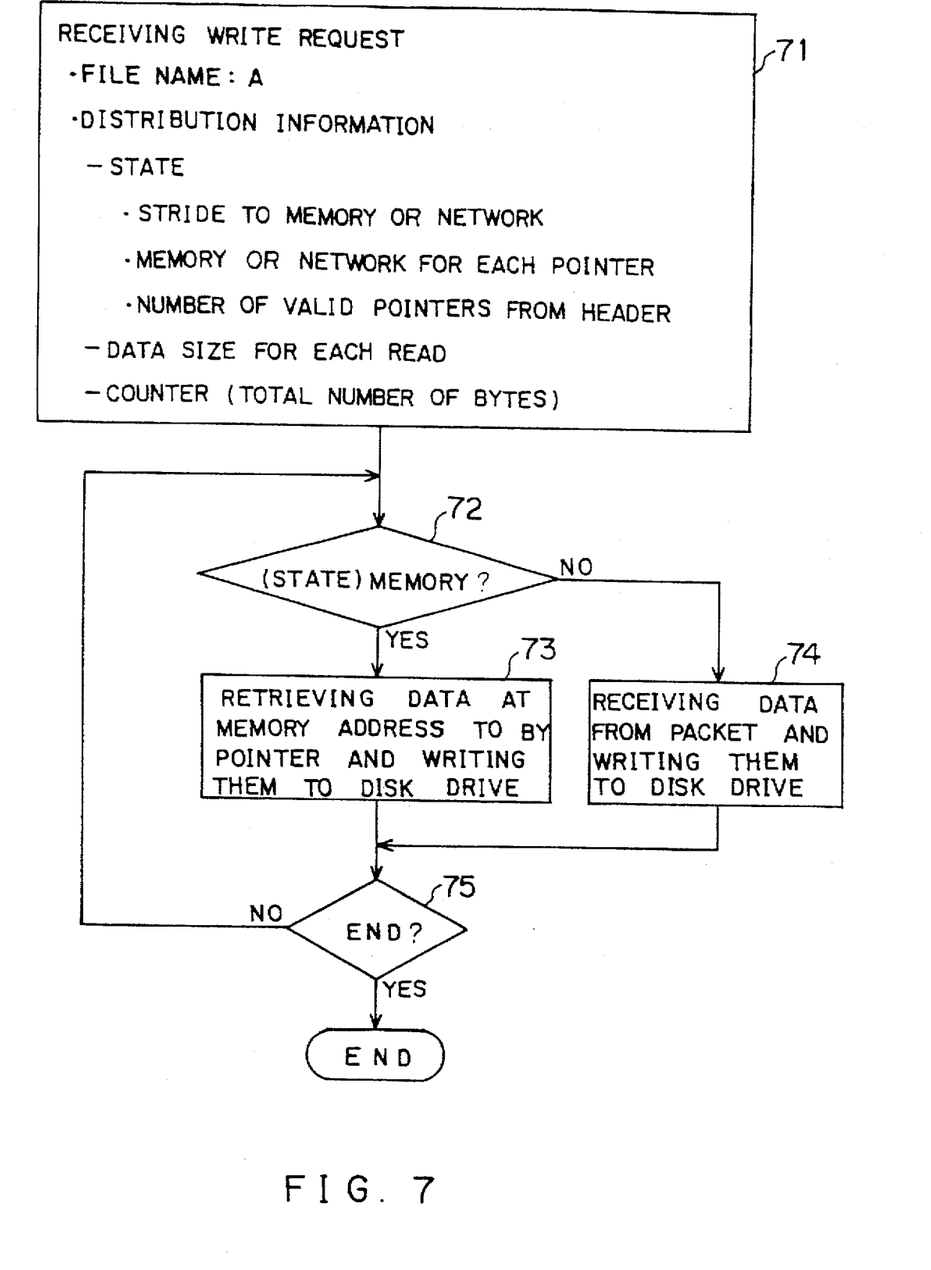
FIG. 7 shows an example (2) of a file server process according to the preferred embodiment of the present invention.

FIGS. 6 and 7 show the processes performed by the file server program 21 (shown in FIG. 1) according to the preferred embodiment of the present invention.

In response to a data read request from each cell, a file server process is carried out as shown in FIG. 6.

First, in step 61, a read request is received. A packet carrying a read request stores a read file name and distribution information. The distribution information indicates a state, data size per stride, and a count value (total number of bytes). Specified as a state are information indicating whether a read stride from the disk devices 19-0~19-3 is performed to the memory 13 or to the network, indicating whether each pointer points to the memory 13 or to the network, indicating the number of valid pointers from the starting position of pointer specification, etc. The above specified information is set in the registers 53~56 in step 61, and then the operation of activating the data distributing/combining unit 16 is performed.

In step 62, the stride send/receive control unit 52 in the data distributing/combining unit 16 (refer to FIG. 4) retrieves the data of the number of bytes specified as data size from the disk devices 19-0~19-3 through the input/output control unit 11. Depending on a specified file attribute, the disk devices 19-0~19-3 can be accessed in the parallel or individual access mode.

In step 63, the stride send/receive control unit 52 refers to a state and determines whether the specified operation is a reading operation to be performed from the disk devices 19-0~19-3 to the memory 13 or a sending operation from the disk devices 19-0~19-3 to the network.

If it is determined in step 63 that the specified reading operation is to be performed from the disk devices 19-0~19-3 to the memory 13, then the stride send/receive control unit 52 writes the data read from the disk block in the disk devices 19-0~19-3 pointed to by pointer 0 in the register 55 (refer to FIG. 4) to the memory 13 at the address specified by pointers 1~9 (refer to FIG. 4) in the register 55 in the data distributing/combining unit 16 in step 64.

If it is determined in step 63 that the specified reading operation refers to an operation of sending data from the disk devices 19-0~19-3 to the network, then the stride send/receive control unit 52 transfers the data read from the disk block in the disk devices 19-0~19-3 pointed to by pointer 0 in the register 55 to the sending ring buffer 50 in the data distributing/combining unit 16, and then a packet is generated as described above and transmitted to the network through the memory controller 15 and the driver 14 in step 65.

Then, in step 66, the stride send/receive control unit 52 repeatedly performs the processes in steps 62~65 until it is determined by referring to the contents of the register 54 that all bytes of the data have been transferred.

Then, the file server process shown in FIG. 7 is performed in response to a data write request from each cell.

A write request is received first in step 71. A packet carrying a write request stores a write file name and distribution information. The distribution information indicates a state, data size per stride, and a count value (total number of bytes). Specified as a state are information indicating whether a write stride to the disk devices 19-0~19-3 is from the memory 13 or the network, indicating whether each pointer points to the memory 13 or to the network, indicating the number of valid pointers from the starting position of pointer specification, etc. The above specified information is set in the registers 53~56 in step 71, and then the operation of activating the data distributing/combining unit 16 is performed.

In step 72, the stride send/receive control unit 52 in the data distributing/combining unit 16 (refer to FIG. 4) refers to a state and determines whether the specified operation is a writing operation to be performed to the disk devices 19-0~19-3 from the memory 13 or a writing operation to the disk devices 19-0~19-3 from the network.

If it is determined in step 72 that the specified writing operation is to be performed to the disk devices 19-0~19-3 from the memory 13, then the stride send/receive control unit 52 reads the data from the memory 13 at the address pointed to by pointer 0 (refer to FIG. 4) in the register 55 (refer to FIG. 4), and writes the data to the disk block in the disk devices 19-0~19-3 pointed to by pointers 1~9 (refer to FIG. 4).

If it is determined in step 72 that the specified writing operation refers to an operation of writing data to the disk devices 19-0~19-3 from the network, then the stride send/receive control unit 52 reads the data written in the receiving ring buffer 51 (refer to FIG. 4) over the network, and the data are written to the disk block in the disk devices 19-0~19-3 pointed to by pointers 1~9 in the register 55.

Then, in step 75, the stride send/receive control unit 52 repeatedly performs the processes in steps 72~74 until it is determined by referring to the contents of the register 54 that all bytes of the data have been transferred.

Figure 8:
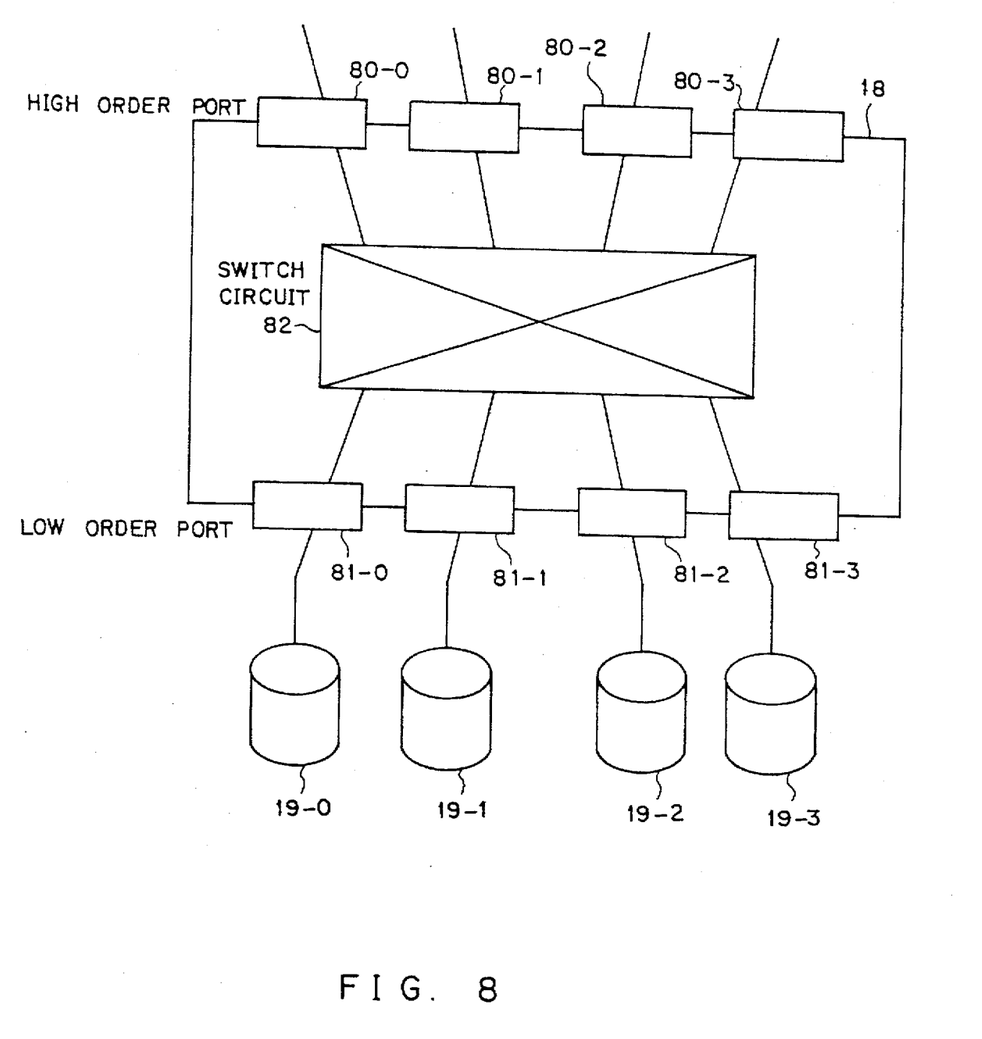
FIG. 8 shows the configuration of the I/O switch according to the embodiment of the present invention.

FIG. 8 shows the configuration of the I/O switch 18 shown in FIG. 1.

The I/O switch 18 comprises high-order ports 80-0~80-3 connected to the I/O interfaces 17-0~17-3 shown in FIG. 1, low-order ports 81-0~81-3 connected to the disk devices 19-0~19-3, and a switch circuit 82 for switching the connections between the high-order ports and the low-order ports. With this configuration, the I/O interfaces 17-0~17-3 can be dynamically connected to the disk devices 19-0~19-3. The present embodiment shows an example of the I/O switch 18 which connects four disk devices 19-0~19-3. However, it is obvious that the number of connected disk devices is not limited to four.

Figure 9A:
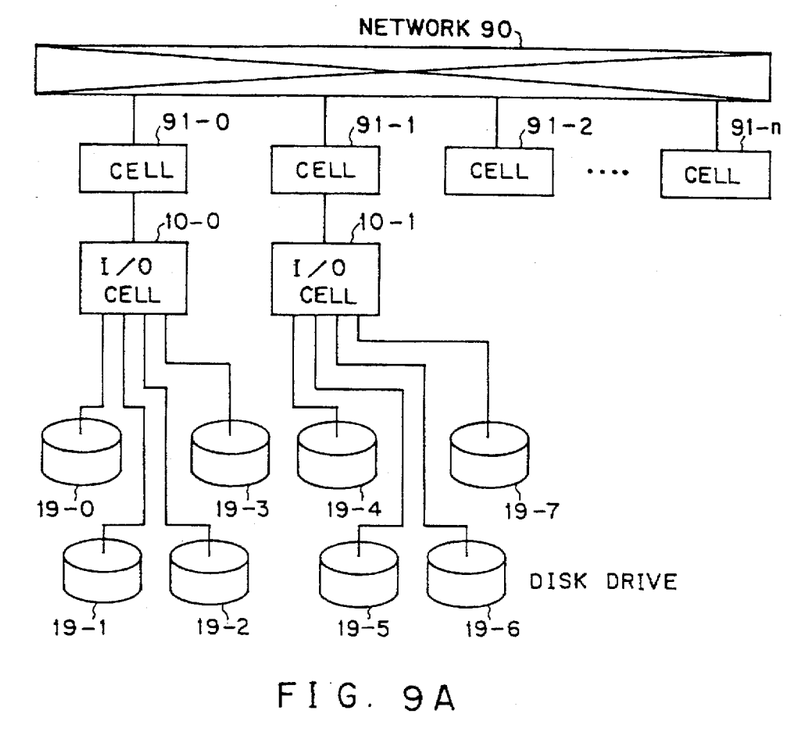
FIGS. 9A and 9B show the configuration of the system according to the preferred embodiment of the present invention.
Figure 9B:
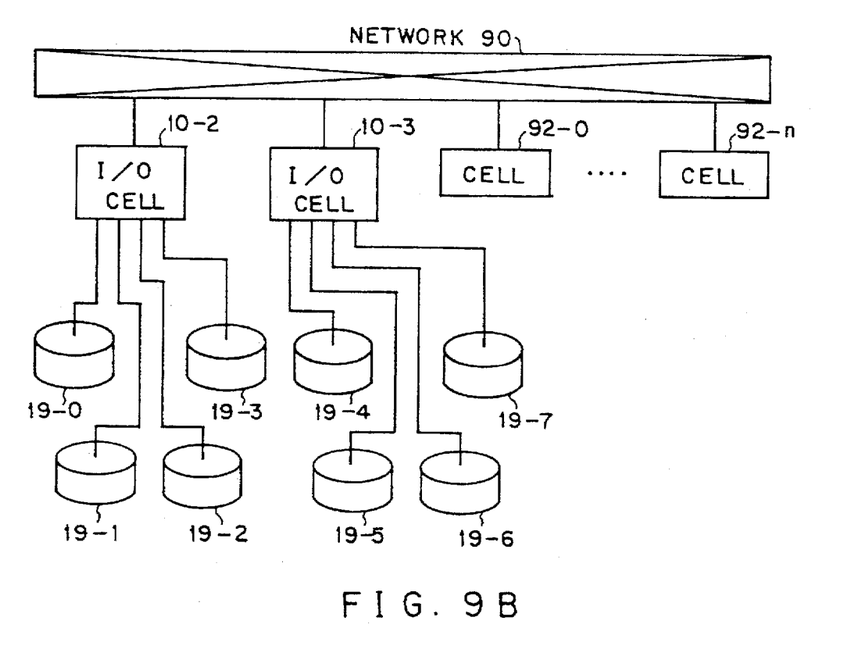

FIGS. 9A and 9B show the configuration of the parallel computer system according to the preferred embodiment of the present invention. A practical example of the parallel computer system using the above described input/output cell 10 can be the configurations shown in FIGS. 9A and 9B. In these figures, I/O cells 10-0~10-3 correspond to the input/output cell 10 shown in FIG. 1. A network 90 can be, for example, a torus network. Cells 91-0~91-m and 92-0~92-n store normal programs. The disk devices 19-0~19-7 are similar to the disk devices 19-0~19-3.

In the parallel computer system shown in FIG. 9A, the input/output cells 10-0 and 10-1 are additionally connected as a subcell to the normal cells 91-0 and 91-1 to attain access to the disk devices 19-0~19-7. Drivers and other units provided for the network 90 in the input/output cells 10-0 and 10-1 (refer to the driver 14 shown in FIG. 1) are shared by the normal cells 91-0 and 91-1 to which the input/output cells 10-0 and 10-1 are connected.

In the parallel computer system shown in FIG. 9B, the input/output cells 10-2 and 10-3 are directly connected to the network 90 independently of normal cells 92-0~92-n. The drivers and other units provided for the network 90 are mounted separately from those mounted for the normal cells 91-0 and 91-1.

What is claimed is:

1. An input/output cell operated in a parallel computer system in which normal cells are connected to a network, said input/output cell comprising:

a plurality of input/output interface devices connected to external storage devices;

mode switch means for switching modes between a parallel access mode in which said plurality of input/output interface device are collectively controlled as if said plurality of input/output interface devices were a single interface device and an individual access mode in which each of said plurality of input/output interface devices are individually controlled; and input/output control means for controlling, using the parallel and individual access modes, access to the external storage devices from the normal cells which are not capable of directly communicating with the external storage devices in the parallel or individual access modes.

2. The input/output cell according to claim 1, further comprising:

file server means for accessing a file processed by the external storage devices controlled by said input/output control means for the normal cells.

3. The input/output cell according to claim 2, wherein said file server means comprises:

a processor to execute a file server program to access a file processed by the external storage devices controlled by said input/output control means for the normal cells;

a memory accessible by said processor;

a memory controller for controlling an access to said memory by said processor; and a driver for controlling an interface to the network.

4. The input/output cell according to claim 1, further comprising:

data distributing means for distributing the data based on a number and a width of a stride specified by one of the normal cells requesting an access to the data when the data are read from the external storage devices to be transmitted over the network.

5. The input/output cell according to claim 4, wherein said data distributing means further comprises a sending ring buffer for temporarily storing the data read from the external storage devices after distributing the data and for generating a packet to be sent over the network for each piece of distributed data.

6. The input/output cell according to claim 1, further comprising:

data combining means for combining data and for writing the data to the external storage devices when the data are received over the network to be written to the external storage devices.

7. The input/output cell according to claim 6, wherein said data combining means further comprises a receiving ring buffer for combining the data received over the network after temporarily storing the data.

8. The input/output cell according to claim 1, wherein said input/output cell is connected as a subcell to one of the normal cells.

9. The input/output cell according to claim 1, wherein said input/output cell is directly connected to the network independently of the normal cells.

10. A parallel computer system, comprising:

input/output interface devices connected to external storage devices;

input/output control means for controlling an access to the external storage devices by normal cells through said input/output interface devices, said input/output control means including a parallel access mode in which said input/output interface devices are collectively controlled as if said input/output interface devices were a single input/output interface device and an individual access mode in which each of said input/output interface devices are individually controlled;

mode switch means for switching between the parallel access mode and the individual access mode; and switching means for dynamically altering a connection between said input/output interface devices and the external storage devices.

11. An input/output cell in a parallel computer system having normal cells which are not capable of directly communicating with external storage devices and input/output interface devices connected to the external storage devices, said input/output cell comprising:

input/output control means for controlling an access to the external storage devices by the normal cells through the input/output interface devices, said input/output control means including a parallel access mode in which the input/output interface devices are collectively controlled as if the input/output interface devices were one input/output interface device and an individual access mode in which each of the input/output interface devices are individually controlled; and mode switch means for switching between the parallel access mode and the individual access mode.

12. An input/output method in a parallel computer system having normal cells which are not capable of directly communicating with external storage devices and input/output interface devices connected to the external storage devices, said input/output method comprising:

controlling an access to the external storage devices by the normal cells through the input/output interface devices, said controlling including a parallel access mode in which the input/output interface devices are collectively controlled as if the input/output interface devices were one input/output interface device and an individual access mode in which each of the input/output interface devices are individually controlled; and switching between the parallel access mode and the individual access mode.

* * * * *